United States Patent [15] 3,691,486
Borsuk et al. [45] Sept. 12, 1972

[54] MODIFIED TIME DOMAIN COMB FILTERS

[72] Inventors: Michael Howard Borsuk, Red Bank; Paul Nolan Browne, Shrewsbury, both of N.J.

[73] Assignee: Bell Telephone Laboratories, Incorporated, Murray Hill, Berkeley Heights, N.J.

[22] Filed: Sept. 2, 1970

[21] Appl. No.: 68,905

[52] U.S. Cl. ................333/70 T, 328/167, 333/28 R
[51] Int. Cl. ..............................................H03h 7/28
[58] Field of Search ............333/70, 29, 28, 18, 70 T; 328/167

[56] References Cited

UNITED STATES PATENTS

| | | | |
|---|---|---|---|
| 2,855,573 | 10/1958 | Fredendall | 333/73 |
| 2,729,698 | 1/1956 | Fredendall | 178/5.4 |
| 2,954,465 | 9/1960 | White | 333/70 T |
| 2,897,442 | 7/1959 | Wright | 324/77 |
| 3,013,209 | 12/1961 | Bickel et al. | 333/70 T |
| 2,987,683 | 6/1961 | Powers | 332/45 |

*Primary Examiner*—Paul L. Gensler
*Attorney*—R. J. Guenther and E. W. Adams

[57] ABSTRACT

A delay line type comb filter is adapted to produce a response in which a selected portion of the comb characteristic is modified. This is accomplished by attenuating the signal through the delay line in a predetermined manner over a selected frequency range and inversely modifying the nondelayed transmission in that range. These two functions are provided by applying the input signal to a filter element having a transfer function appropriate to the desired modification and combining the filtered output with the input signal in two combiners (one additive and one subtractive). The differential resultant signal is applied to the delay line to produce the prescribed attenuation and the additive resultant signal (enhanced inversely to the differential resultant) is added to the output of the delay line producing the desired modified comb transmission characteristic.

11 Claims, 10 Drawing Figures

INVENTORS M. H. BORSUK
P. N. BROWNE
BY David L. Hurewitz
ATTORNEY

MODIFIED TIME DOMAIN COMB FILTERS

BACKGROUND OF THE INVENTION

This invention relates to comb filter circuits which may be used for separating frequency interleaved signals, such as video waveforms, and more particularly to comb filters of the time domain or delay line type which are adapted to produce a modified comb characteristic.

One of the numerous well-known multiplexing techniques involves interleaving the components of different signals at discrete frequencies in the spectrum. Such interleaving is particularly applicable to multiplexing television signals since conventional scanning inherently produces a frequency spectrum in which substantially all of the energy is distributed at harmonics of the line frequency. As an example, a color television camera is a source of synchronized color signals which may be interleaved in this manner. A comb characteristic filter provides a means for separating the interleaved signals.

Comb filters have characteristics which are periodic in the frequency domain. Such characteristics may be developed in a straightforward manner by a bank of narrowband filters or by a class of devices using delay lines and referred to as time domain or delay line filters. The latter type of comb filter can provide a linear phase response and consists of a delay line and a combiner which combines the instantaneous input and the delayed input. The resultant output has a transmission characteristic whose periodicity in the frequency domain is an inverse function of the delay. The basic form of the comb filter utilizes a single delay line and exhibits a multiplicity of periodically repetitive pass and attenuated bands while cascaded delay lines can produce more complex characteristics.

The essential characteristic of the comb filter is its periodicity. The basic filter, for example, exhibits recurrent peaks and valleys or pass and rejection bands throughout the entire spectrum; that is, the response in a particular frequency range 0 to $f$ is the same as the response in the range $f$ to $2f$, $2f$ to $3f$, etc. This response enables one such filter to "comb" a single interleaved signal out of a multiplexed composite, and a second filter can remove another interleaved signal from the composite if the second comb characteristic is appropriately shifted. In some applications "combing" over the entire spectrum is desirable, while in others transmission of only a segment of the spectrum is required and a band rejection filter is connected in series with the comb filter to appropriately truncate the transmission.

In certain applications it is necessary to remove or modify the comb response over a selected portion of the spectrum without affecting the comb characteristic outside that portion and without preventing transmission within that portion. For example, in television systems it may be useful to pass an entire low frequency segment of the spectrum which is essentially filled with the vertical information while providing a comb response for the higher portion of the spectrum to remove an interleaved waveform. In addition to this low pass modification, other alterations of the comb characteristic may be desired in other applications.

SUMMARY OF THE INVENTION

In accordance with the present invention a time domain comb filter is adapted to provide a response in which the comb characteristic of a selected portion of the spectrum is modified. Specific forms of the modification result in a characteristic having low pass, high pass and/or bandpass segments within an overall comb response. The comb filter is adapted to alter the comb response in only a selected portion of the spectrum. This is accomplished by attenuating the signal through the delay line in a predetermined manner over the selected frequency range and inversely modifying the nondelayed transmission in that range. These two functions are provided by applying the input signal to a filter element having a transfer function appropriate to the desired modification and combining the filtered output with the input signal, both additively and differentially. The differential resultant is applied to the delay line to produce the prescribed attenuation and the additive resultant signal (enhanced inversely to the differential resultant) is added to the output of the delay line producing the modified comb transmission characteristic.

The filter element may exhibit a bandpass characteristic, in which case the comb characteristic is modified by substitution of a passband in the bandpass region. A band rejection filter may also be used in which case the modified characteristic will comb only in the rejection band and pass all other frequencies. Other filter responses will similarly modify the output characteristic by reducing the depths of the nulls proportionately to the transmission characteristic of the filter element.

DETAILED DESCRIPTION

One member of the class of time domain filters exhibits a periodic response in the frequency domain and is referred to as a comb characteristic filter. The most basic circuit of this type provides repetitive nulls and transmission bands. Two complementary types of comb filters are shown in FIGS. 1 and 2.

Figure 1:
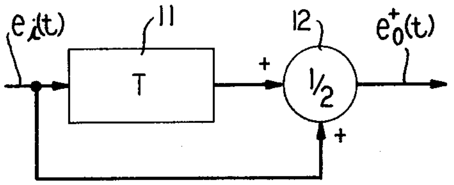
FIG. 1 PRIOR ART
FIGS. 1 and 2 are block diagrams of specific types of comb filters known in the prior art.
Figure 2:
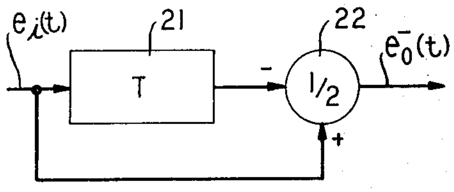
FIG. 2 PRIOR ART

The transfer function for the block diagram of FIG. 1 is:

$$C^+(s) = ½\, e^{-Ts} + ½ \quad (1)$$

$$C^+(s) = ½\,(1 + e^{-Ts}) \quad (1a)$$

where $s$ is the complex frequency variable $j\omega$. Similarly, the transfer function for the filter of FIG. 2, which has a characteristic displaced from that of FIG. 1 by ½T is:

$$C^-(s) = ½\,(1 - e^{-Ts}) \quad (2)$$

Figure 1A:
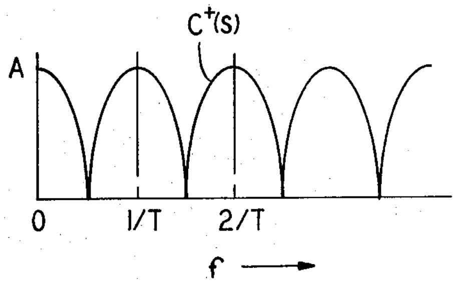
FIGS. 1A and 2A are graphical representations of the transfer functions of the comb filters of FIGS. 1 and 2, respectively.
Figure 2A:
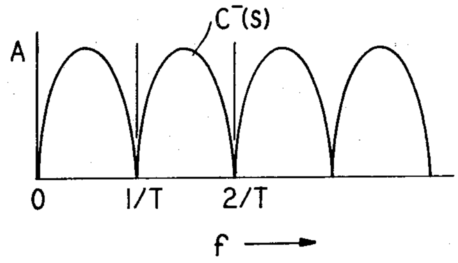
Figure 5A:
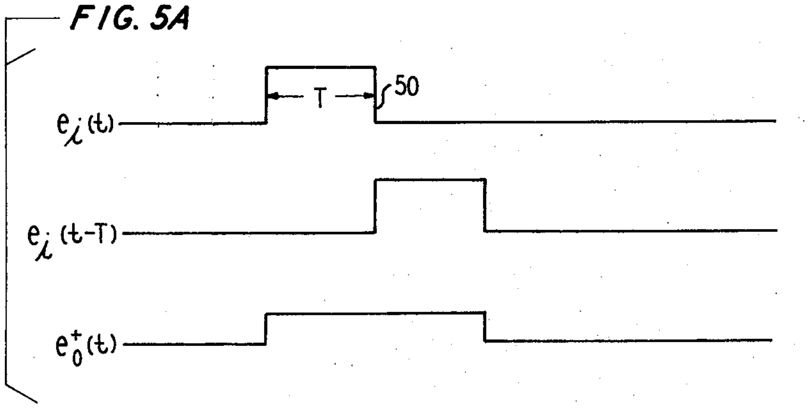
FIGS. 5A and 5B are graphical representations of instantaneous waveforms at various points in the circuits of FIGS. 1 and 3, respectively, for a selected input.

The frequency characteristics of the two filters are shown in FIGS. 1A and 2A where the magnitudes of the transfer functions $C^+(s)$ and $C^-(s)$ of the filters in FIGS. 1 and 2, respectively, are plotted against frequency. The circuits operate essentially to average the instantaneous input $e_i(t)$ and the delayed input $e_i(t-T)$ as shown in FIG. 5A which shows waveforms generated in the circuit of FIG. 1 in response to a single white line on a black raster. The periodicity of the comb characteristic is an inverse function of the delay provided by delay line 11 or 21, and the nulls are due to phase cancellation between the delayed and undelayed signals. Since phase reinforcement would cause an amplitude twice that of the input, combiners 12 and 22 attenuate the combined output by one-half (as indicated by the "½" within the symbols) to produce a unity response. In FIG. 1 the peaks of the combed output transmission $e_o^+(t)$ will be at the frequencies 0,1/T, and the harmonics of 1/T, due to the additive combination of combiner 12. Conversely, the differential output produced by combiner 22 in FIG. 2 produces peaks at ½T and the odd harmonics of ½T while producing nulls at 0,1/T and the harmonics of 1/T. A combination of the two filters can, of course, be used to separate two signals, one of which has its energy distributed at the harmonics of 1/T and the other at odd harmonics of 1/2T.

Figure 3:
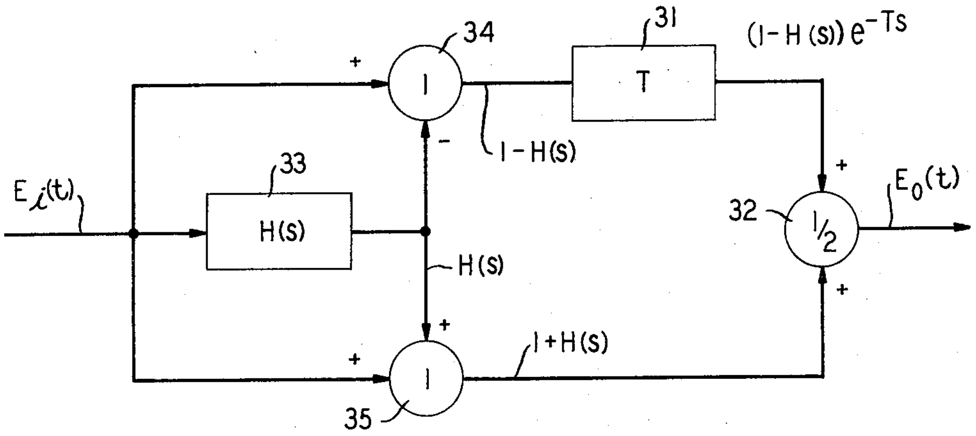
FIG. 3 is a block diagram of a modified comb filter in accordance with the present invention.

In accordance with the present invention the filters of the type illustrated in FIGS. 1 and 2 are adapted as shown in FIG. 3 to provide a modified comb response in which the nulls in a selected portion of the frequency spectrum are removed or modified without affecting the comb characteristic in the remainder of the spectrum.

The modified comb filter includes, in addition to delay line 31 and combiner 32 corresponding to those elements in conventional comb filters, filter section 33 having a transfer function H($s$) and two unity combiners 34 and 35. Transfer function H($s$) is chosen so that the output of differential combiner 34, 1 − H(5), is attenuated in a prescribed manner in a selected frequency range and so that the output of additive combiner 35, 1 + H($s$), is the input signal enhanced inversely to the differential resultant. The attenuated signal delayed for time T by delay line 31 is combined by combiner 32 with the enhanced signal from combiner 35. As in the conventional comb filter, combiner 32 also provides an attenuation of one-half in order to provide an overall unity response.

Analysis of the block diagram of FIG. 3 leads directly to the following equations, indicating the overall transfer function C(s):

$$C(s) = ½\,(1 - H(s))e^{-Ts} + ½\,(1 + H(s)) \quad (3)$$

$$C(s) = ½\,(1 = e^{-Ts}) + ½\,(1 - e^{-Ts})\,H(s) \quad (3a)$$

Figure 4A:
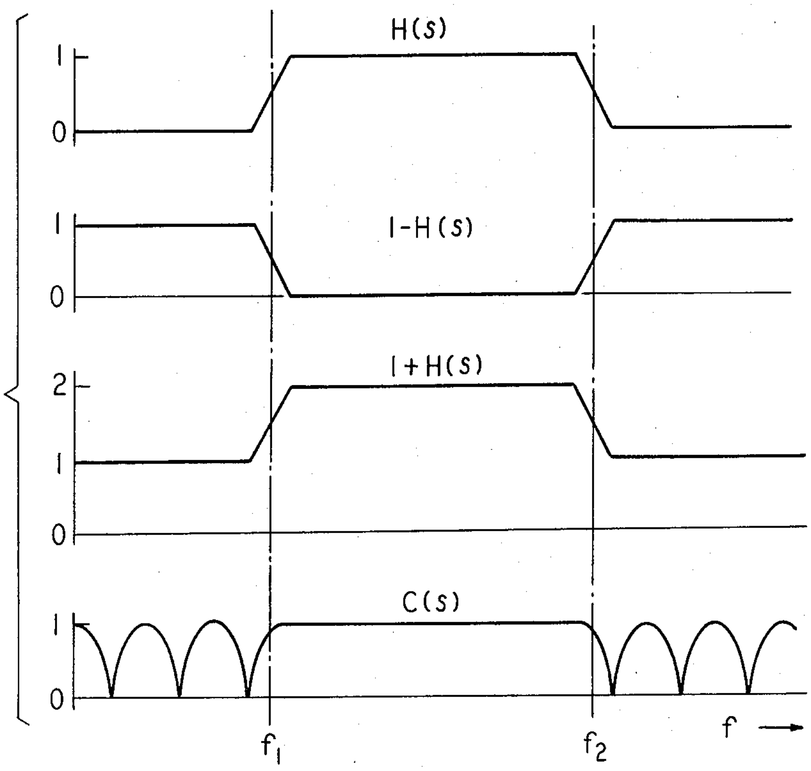
FIG. 4A is a graphical representation of the magnitude of transfer functions at various points in the circuit of FIG. 3 where the filter 33 has a bandpass characteristic.

FIG. 4A illustrates the frequency characteristics at various points in the circuit of FIG. 3 where H($s$) has a bandpass characteristic between frequencies $f_1$ and $f_2$. In this frequency range where $H(s) = 1$, the second term of the transfer function combines with the first term so that $C(s) = 1$. There is therefore no combing of any kind in the frequency region $f_1$ to $f_2$. For the frequency range where $H(s) = 0$, only the first term remains in equation 3$a$ and C($s$) is identical to equation 1a, indicating a comb characteristic response. The transfer function C($s$) for this bandpass modified comb filter is illustrated in the bottom line of FIG. 4A. Only one filter with a transfer function H($s$) is needed in the modified configuration and its bandpass corresponds to the region in which no combing is desired in the modified characteristic. Transfer function H($s$) is chosen so that the delayed signal is attenuated in the selected frequency range and the output $E_o(t)$ in this range is the undelayed signal divided by two; combing is therefore eliminated. By inversely enhancing the gain characteristic of the undelayed signal path a unity passband is realized in this selected frequency range.

Figure 4B:
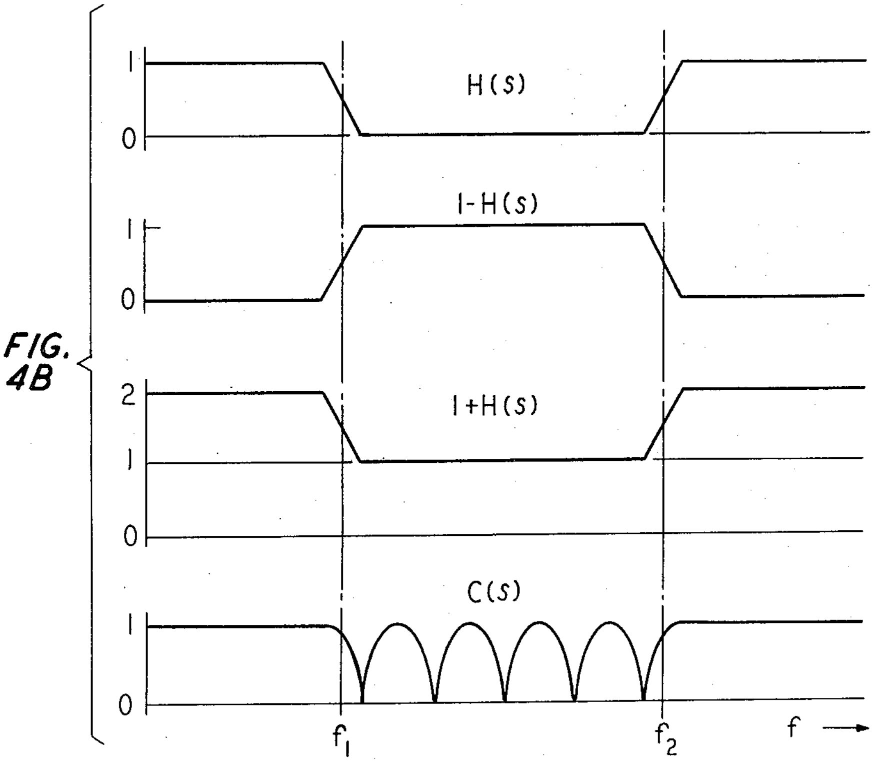
FIG. 4B is a graphical representation of the magnitude of transfer functions at various points in the circuit of FIG. 3 where the filter 33 has a band rejection characteristic.

Filter 33 may, of course, have a band rejection characteristic between frequency $f_1$ and $f_2$ as indicated in FIG. 4B. Such a rejection characteristic results in attenuation of the delayed signal below $f_1$ and above $f_2$ and hence provides a comb characteristic within the range $f_1$ to $f_2$ with uncombed transmission above and below that portion.

In addition to bandpass and band rejection characteristics, filter 33 may have any other form of transmission response and the resultant attenuation of the delayed signal in the selected frequency range will cause a corresponding modification of the overall transfer function. Filter 33 may have any transfer function H($s$), including a comb filter response. However, in order to appropriately modify the overall comb characteristic H($s$) should be normalized to unity in its passband. Filter 33 may be constructed to provide any desired transfer function in a conventional manner as described in the literature, such as the *Handbook of Filter Synthesis*, by Anatol I. Zverev, published by John Wiley and Sons, Inc., New York, 1967. If H($s$) is normalized to one, the overall transmission of the modified comb filter is unity where H($s$) is one, and where H($s$) is attenuated the depth of the nulls of the comb characteristic are reduced in direct proportion to the transmission of H($s$) and hence the magnitude (or difference in transmission between the peaks and valleys) of the comb response exists in inverse proportion to the transmission of H($s$). If H($s$) attenuates to zero transmission, the output of the modified comb filter will be an ordinary comb characteristic.

FIG. 3 and the discussion above have been directed to the additive characteristic of combiner 32 and the resultant characteristic having combing peaks at harmonics of 1/T, but the complementary comb characteristic may be achieved by using the appropriate algebraic sign in combiner 32 for the combining delayed signal. The differential form of combiner 32 providing a negative input for the delayed signal from delay line 31 would, of course, result in a comb characteristic with peaks at odd harmonics of ½T and would have an overall transfer function C($s$) of $$C(s) = ½ (1 - e^{-Ts}) + ½ (1 + e^{-Ts}) H(s)$$

Figure 5B:
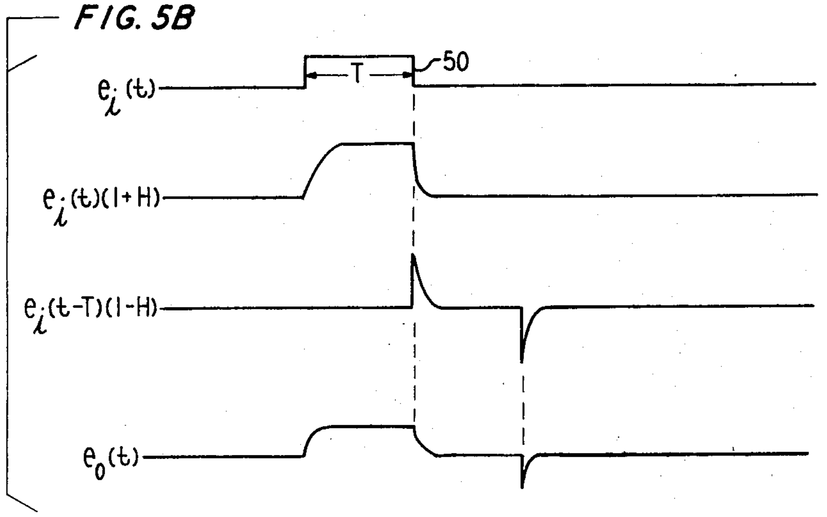

A particular application of the modified comb filter of FIG. 3 is found in television systems, since the energy in a television signal tends to be grouped around multiples of the line scan frequency with little of no energy between these groups. It is therefore feasible to multiplex two video signals together in a manner that interleaves their frequency spectra. Complementary comb filters are used to separate these signals at the receiver. As one example, consider a first video signal having a line frequency of 1/T sent in a usual fashion with a second signal interleaved in the high frequency spaces of the spectrum as illustrated in graph (*a*) of FIG. 6. It has been found that the vertical resolution of a television picture is deteriorated when the composite signal is passed through a conventional comb filter which has nulls between the energy groups. Most of the deterioration appears to be caused by the lowest frequency nulls of the comb filter since vertical resolution relates to the low frequency content of the video spectrum. Removal of the first few nulls is accomplished with the modified comb configuration of FIG. 3 where filter 33 has a low pass characteristic with a corner frequency above the line scan frequency of the system and below the energy of the second signal. This processing provides significant improvement of the vertical resolution as can be seen by comparing of FIGS. 5A and 5B which show the time responses to a vertical transition, specifically a single white line on a black raster, of the conventional comb filter of FIG. 1 and the modified comb filter of FIG. 3, respectively. The modified output signal $e_o(t)$ in FIG. 5B is clearly more responsive to the trailing edge 50 of the input wave $e_i(t)$ than is the conventional output $e_o^+(t)$ in FIG. 5A, which spreads the response over an additional line of duration T.

Figure 6:
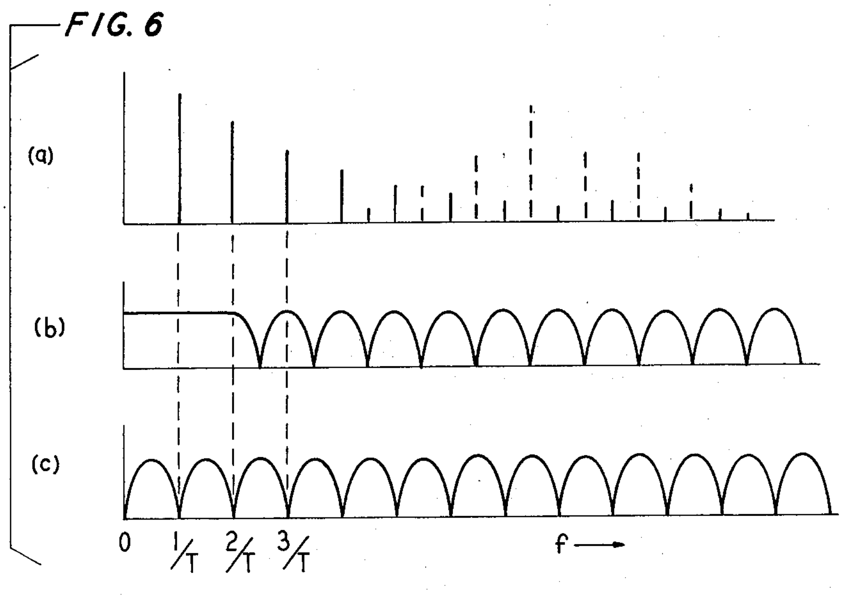
FIG. 6 is a graphical representation of the frequency spectrum of an interleaved multiplexed composite and comb characteristic of filters appropriate to separate the interleaved signals.

The low pass modified comb filter having a characteristic shown in graph (*b*) of FIG. 6 would pass the first signal while combing over the upper frequency range to attenuate the interleaved second one. A conventional comb filter with nulls at appropriate frequency multiples as shown in graph (*c*) of FIG. 6 could be used to pass the second signal while attenuating the first signal. If the vertical resolution of the second signal is also important, a bandpass modified comb filter in lieu of the conventional comb filter could be used to separate the second signal and as well. Thus, two video signals could be transmitted over one channel with less intersignal interference and better resolution than would have been possible with one comb filter or with a standard comb filter which would inherently lose part of the low frequency information.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A modified comb characteristic filter responsive to an input signal comprising: means for filtering the input signal to produce a filtered output having a selected transmission characteristic, a first means for combining the input signal with the filtered output to produce an inverse signal having the inverse transmission characteristic of the filtered signal, a second means for combining the input signal and the filtered output to produce an enhanced signal having the filtered transmission characteristic superposed upon the input signal, means for delaying the inverse signal and a third means for combining the delayed inverse signal with the enhanced signal to produce a modified comb characteristic output.

2. A modified comb characteristic filter of claim 1 wherein the selected transmission characteristic of said filtering means is normalized to one in its passbands.

3. A modified comb characteristic filter of claim 1 wherein the selected transmission characteristic of said filtering means provides unity transmission in a selected passband whereby the output of said comb characteristic filter has an unattenuated transmission response through out the selected passband.

4. A modified comb characteristic filter of claim 1 wherein the selected transmission characteristic of said filtering means provides zero transmission in a selected rejection band whereby the output of said comb characteristic filter has a comb characteristic response exclusively within the rejection band.

5. A modified comb characteristic filter of claim 1 wherein said delaying means provides a fixed delay of time T and said third means for combining is additive, whereby the frequencies of the nulls of the output comb response are odd multiples of 1/2T.

6. A modified comb characteristic filter of claim 1 wherein said delaying means provides a fixed delay of time T and said third means for combining is differential and subtracts the delayed inverse signal from the enhanced signal, whereby the frequencies of the nulls of the output comb response are 0 and multiples of 1/T.

7. A modified comb characteristic filter of claim 1 wherein said third means for combining includes means for attenuating the output signal by one-half.

8. A comb filter responsive to an input signal comprising:

- a first path for said input signal,
- a second path for said input signal including a delay different from said first path,
- means for combining signals from said first and second paths to produce a comb characteristic output,
- means for modifying said characteristic such that its magnitude exists in inverse proportion to a preselected transmission characteristic,
- said last means including filter means having said preselected transmission characteristic for filtering a portion of the frequency spectrum of said input signal,
- and means for combining the output of said filter means with the signals in each of said paths,
- wherein said last combining means combines the output of said filter means in respectively different signs in each of said paths.

9. A comb filter of claim 8 wherein said filter means has a bandpass characteristic of unity transmission between a first and a second frequency and said modified comb filter produces unity transmission between said first and second frequencies.

10. A comb filter of claim 8 wherein said filter means has a rejection characteristic and unity transmission below and above a first and a second frequency, respectively, and wherein said modified comb filter provides a comb response exclusively between said first and second frequencies.

11. A time domain configuration responsive to an input signal including a first path for said input signal, a second path for said input signal including a delay different from said first path and means for combining signals from said first and second paths to produce a comb characteristic output, characterized in that said configuration further includes:

means for modifying said characteristic such that its magnitude exists in inverse proportion to a preselected transmission characteristic, said last means including filter means having said preselected transmission characteristic for filtering a portion of the frequency spectrum of said input signal, and means for combining the output of said filter means with the signals in each of said paths, wherein said last combining means combines the output of said filter means in respectively different signs in each of said paths.

* * * * *